US007008348B2

(12) United States Patent
LaBath

(10) Patent No.: US 7,008,348 B2
(45) Date of Patent: Mar. 7, 2006

(54) GEARBOX FOR WIND TURBINE

(75) Inventor: Octave LaBath, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 10/778,583

(22) Filed: Feb. 12, 2004

(65) Prior Publication Data
US 2004/0162181 A1 Aug. 19, 2004

Related U.S. Application Data

(60) Provisional application No. 60/447,976, filed on Feb. 18, 2003.

(51) Int. Cl.
*F16H 57/08* (2006.01)
(52) U.S. Cl. ............... 475/338; 475/339; 475/341; 475/348
(58) Field of Classification Search ............... 475/338, 475/339, 341, 348
See application file for complete search history.

(56) References Cited

U.S. PATENT DOCUMENTS

| 4,590,820 | A | | 5/1986 | Hambric |
| 5,663,600 | A | | 9/1997 | Baek et al. |
| 6,117,036 | A | * | 9/2000 | Lanzon et al. ............... 475/204 |
| 6,148,940 | A | | 11/2000 | Hokanson et al. |
| 6,176,804 | B1 | * | 1/2001 | Kekki et al. ................. 475/331 |
| 6,420,808 | B1 | | 7/2002 | Hosle |
| 6,459,165 | B1 | * | 10/2002 | Schoo .......................... 29/1 C |
| 6,790,156 | B1 | * | 9/2004 | Hosle .......................... 475/331 |

FOREIGN PATENT DOCUMENTS

JP 04331849 A * 11/1992

* cited by examiner

Primary Examiner—Charles A. Marmor
Assistant Examiner—David D. Le
(74) Attorney, Agent, or Firm—Gerald W. Spinks

(57) ABSTRACT

A wind turbine gear box having a compound planetary gear arrangement having bearings providing improved reliability and with greater accessibility for servicing. The gear box has planet pinions and planet gears being rotated by a planet carrier around a sun gear which drives a final reduction stage, the final reduction stage and the adjacent end of the planet carrier being removable from the gear box housing to allow easy removal of the planet pinions and their associated bearings.

14 Claims, 4 Drawing Sheets

GEARBOX FOR WIND TURBINE

CROSS REFERENCE TO RELATED APPLICATIONS

This application relies upon U.S. Provisional Patent Application Ser. No. 60/447,976, filed on Feb. 18, 2003, and entitled "Gearbox for Wind Turbine."

STATEMENT REGARDING FEDERALLY SPONSORED RESEARCH OR DEVELOPMENT

Not Applicable

BACKGROUND OF THE INVENTION

1. Field of the Invention

The present invention relates to a wind turbine and, in particular, to a gearbox interposed between a rotor of a wind turbine and an electrical generator.

2. Background Art

It is known to use a planetary gearbox to drive an electric generator in response to rotation of a rotor of a wind turbine. The rotor provides a low speed, high torque input to the gearbox. The gearbox provides a high speed, low torque output to the generator. This type of gearbox has been used in this application for approximately twenty years. It is also known that the planet gears of such a gear box, and the bearings associated therewith, are subjected to high lateral loads and thus suffer from high rates of wear under such demanding usage and do not provide ready accessibility for the maintenance, repair and replacement of these key wear components.

U.S. Pat. No. 6,420,808 titled "Gearing for Wind Generator" shows a gearbox for driving a generator by wind force. The gearbox includes a multi-stage epicyclic gearing arrangement and a spur gear stage for the drive output to the generator. The input from the turbine rotor drives a ring gear to rotate about an axis. The ring gear meshes with planet gears at the interior of the ring gear, and the planet gears are fixed in position in a housing. The planet gears drive a sun gear rotatable about the centerline of the gear box and this in turn, through a set of spur gears, drives an output shaft connected to the generator. This gear box suffers from several limitations that reduce its reliability of operation, and make repair and replacement of key wear components more difficult. Planet gears 19 carried by planet gear shafts 17 overhang the adjacent outer bearings for these shafts (i.e., are mounted cantilevered relative to these bearings). This arrangement generates increased lateral forces on the outer and inner bearings. Moreover, the inner bearing is narrower and of smaller inner and outer diameter than the outer bearing, thereby reducing its load carrying capacity relative to the outer bearing. The reduced inner and outer diameters are necessitated by space constraints imposed by the inner end of the ring carrier 12. In addition, access to both the inner and outer bearings for servicing requires disassembly of the entire gear box.

As shown in U.S. Pat. No. 6,148,940, commonly assigned to General Electric Company, it is also known to use planetary gearboxes for motorized wheels of a large off-road vehicle, specifically, a vehicle used in open-pit mining. An electric motor, having a high speed, low torque output, is connected with the input of the gearbox. The gearbox in response provides a low speed, high torque output to the wheel, to rotate the wheel.

U.S. Pat. No. 5,663,600 shows a large planetary gear set that is used in transferring torque from a wind rotor to a shaft/generator. The gear set includes a ring gear that rotates with the rotor.

BRIEF SUMMARY OF THE INVENTION

The present invention includes, by way of example, a gearbox having a set of planet pinions carried by a planet carrier which is driven by a wind driven device such as a rotor blade. A set of gear teeth are formed on each planet pinion. Each planet pinion is caused to rotate faster than the rotor because of the meshing of its pinion gear teeth with a larger, substantially stationary, ring gear. A planet gear mounted to each planet pinion is rotated by its respective planet pinion. All of the planet gears mesh with and drive a smaller sun gear which rotates substantially about the central axis of the planet carrier. The sun gear rotates faster than the larger planet gears. The sun gear drives a larger final stage gear which is mounted on the sun gear by a splined connection. The final stage gear meshes with a smaller set of gear teeth on an output pinion and drives the output pinion faster than the sun gear.

Planet bearings are located on each end of each planet pinion outboard of its pinion and planet gears, to support the planet pinions relative to the planet carrier. One end of the planet carrier is connected to and rotates along with the rotor, and the other end is open to receive the planet pinions. A carrier end plate is detachably secured to the planet carrier. A first bearing on a first end of each planet pinion supports the planet pinion from the planet carrier. A second bearing on the second end of each planet pinion supports the planet pinion from the carrier end plate. The output or final stage end of the gearbox housing is removable, along with the output pinion and the final stage gear, to allow removal of the carrier end plate. Removal of the carrier end plate allows for easy removal of the planet bearings on the second ends of the planet pinions. Then, the planet pinions can be removed from the planet carrier, followed by removal of the planet bearings on the first ends of the planet pinions.

In addition to this enhanced accessibility of the planet bearings in the event that servicing is required, the planet bearings of this invention have increased load carrying capacity and reliability. In that regard, the bearings at the first and second ends of the planet pinions are of approximately equal size and load carrying capability (i.e., of the same type and of generally the same width and inner and outer diameters). In addition, the outer diameter of each of these bearings is approximately twice that of its inner diameter, thereby providing adequate space for high capacity bearing members. The first and second bearings are positioned at the ends of the respective planet pinions, with the planet pinion gear teeth and planet gear being positioned between the planet bearings. Thus, the planet pinion is supported along its entire length by the bearings, with no overhanging or cantilevered portions that impose increased stress on the bearings.

The novel features of this invention, as well as the invention itself, will be best understood from the attached drawings, taken along with the following description, in which similar reference characters refer to similar parts, and in which:

DETAILED DESCRIPTION OF THE INVENTION

Figure 1:
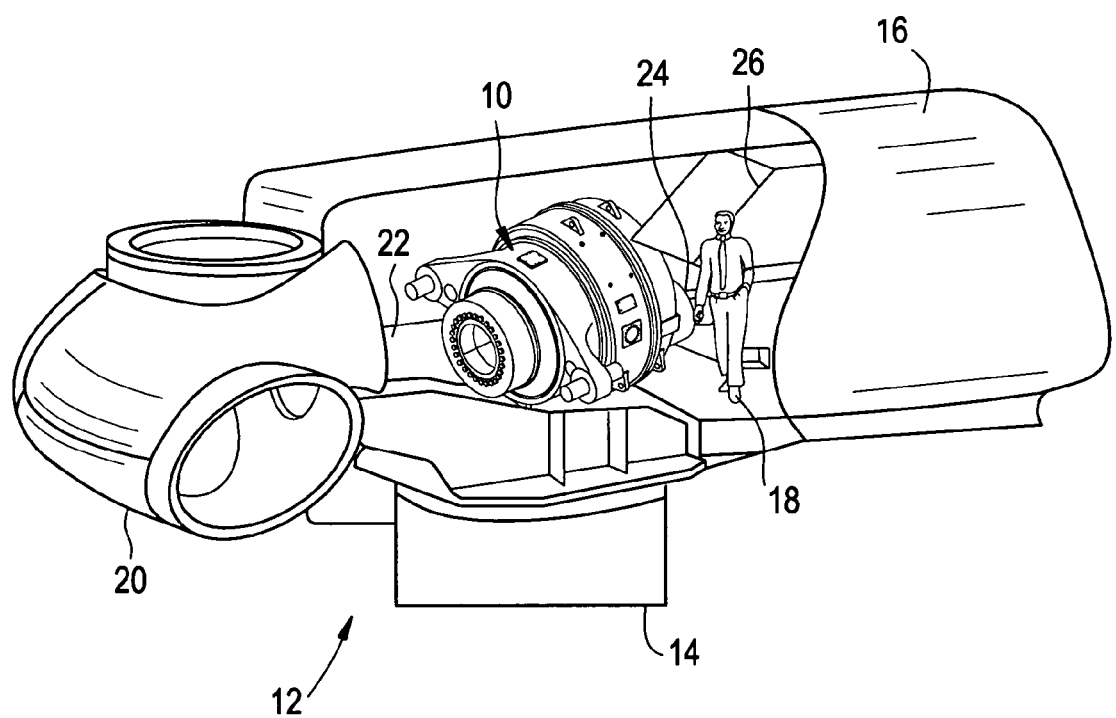
FIG. 1 is a cut-away illustration of a wind turbine that includes a gearbox in accordance with one embodiment of the invention.

The present invention relates to a wind turbine and, in particular, to a gearbox interposed between a rotor of a wind turbine and an electrical generator. The present invention is applicable to various gearbox constructions. FIG. 1 illustrates schematically a gearbox 10 in accordance with one embodiment of the invention.

The gearbox 10 forms part of a wind turbine 12. The wind turbine 12 includes a support post or pylon 14. The pylon 14 supports a turbine housing 16. The gearbox 10 is supported in the turbine housing 16. The size of the gearbox 10 is indicated schematically by the silhouette 18 of the person standing inside the wind turbine housing 16.

A rotor 20 is supported on the turbine housing 16 for rotation relative to the turbine housing. The rotor 20 is connected by a rotor shaft 22 to the input end of the gearbox 10. The output end of the gearbox 10 is connected by an output shaft 24 to a generator 26.

The rotor 20 rotates in response to air movement past the wind turbine 12. The rotational force of the rotor 20 is transmitted through the rotor shaft 22, the gearbox 10, and the output shaft 24, to the generator 26. The generator 26 generates electricity.

Figure 2:
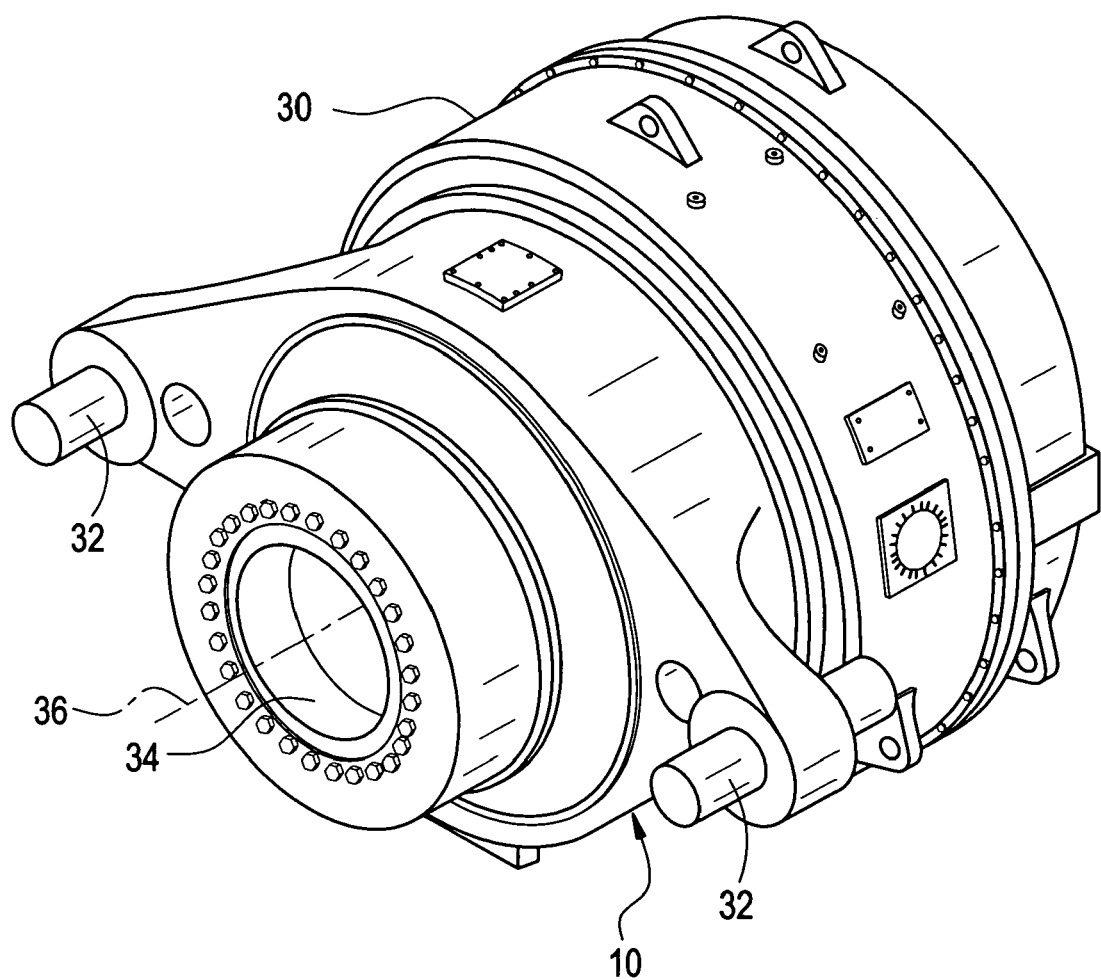
FIG. 2 is a perspective view of the input end of the gearbox of FIG. 1.
Figure 3:
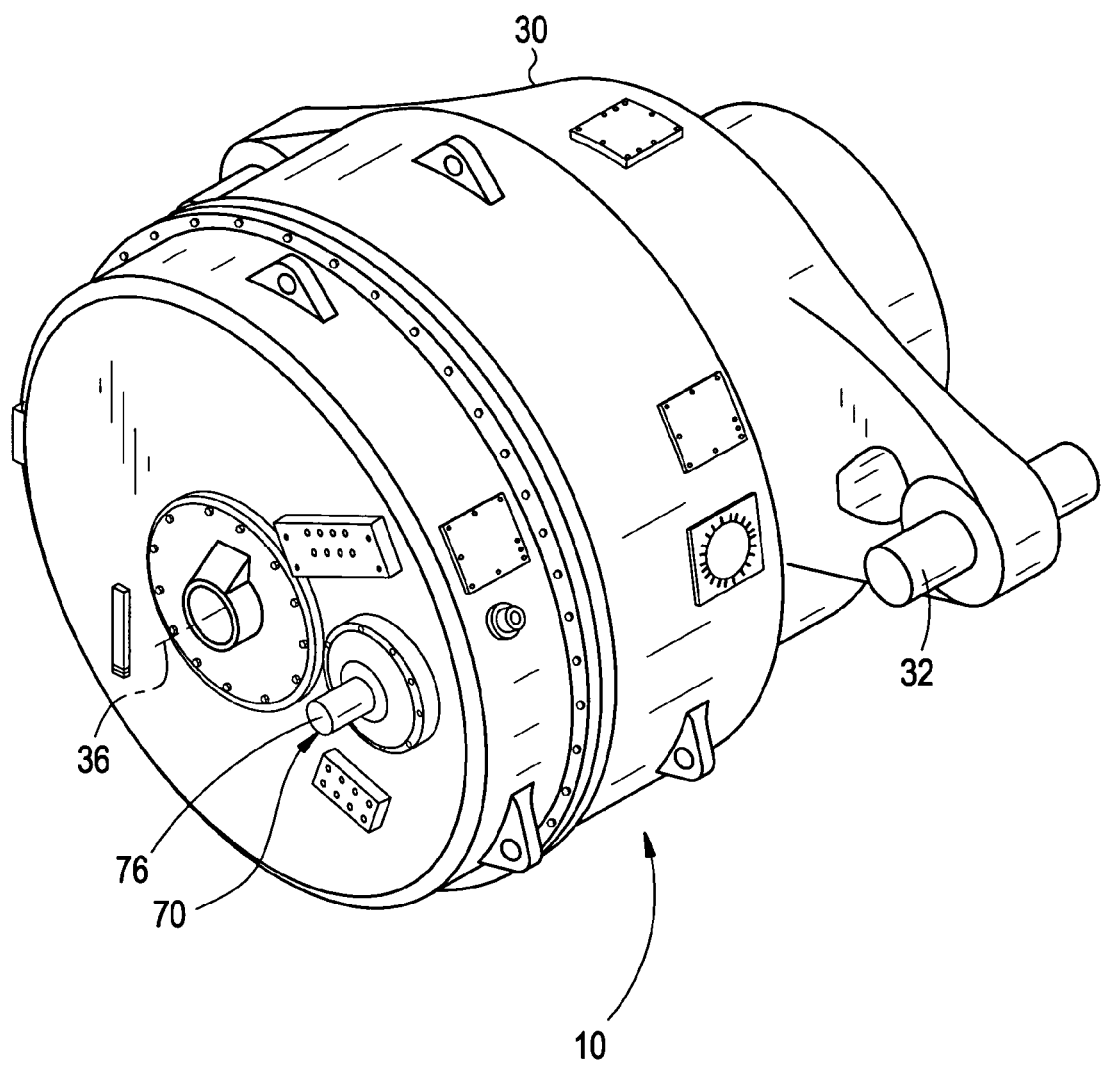
FIG. 3 is a perspective view of the output end of the gearbox of FIG. 1.

The gearbox 10 (FIGS. 2 through 4) includes a gear box housing 30 that as illustrated is made of several components or covers that are detachably secured together. The gear box housing 30, as illustrated, includes an input end cover 82, a planet gear cover 84, and a final stage cover 92. The gearbox housing 30 is supported on the turbine housing 16 by support pins 32.

The input end cover 82 of the gearbox housing 30 extends around and supports a planet carrier 40 (FIG. 4), for rotation of the planet carrier 40 relative to the housing 30 about a central axis 36 of the planet carrier 40. An input hub 34 on a first end of the planet carrier 40 is coupled to the rotor shaft 22, in a suitable manner, not shown, for rotation with the rotor 20. The input hub 34 receives rotational force from the rotor 20 and rotates the planet carrier 40 relative to the gearbox housing 30 in response to that rotational force. The second end of the planet carrier 40, as illustrated, is substantially open, with a detachably mounted end plate 88 attached to the second end of the planet carrier 40. This removable carrier end plate 88 acts as a planet bearing support, as explained below.

The planet carrier 40 supports a plurality of planet pinions 42 therein for orbital movement about the carrier axis 36. In the illustrated embodiment, three planet pinions 42 are provided, spaced apart equally about the carrier axis 36. Only one planet pinion 42 is visible in FIG. 4. Bearings support the planet pinions 42 for rotation relative to the planet carrier. Specifically, a first planet bearing 46, mounted at the first end of the planet carrier 40, engages and supports a first end of each planet pinion 42, supporting that end of the planet pinion 42 directly from the planet carrier 40. A second planet bearing 48, which is mounted on the planet carrier end plate 88, engages and supports a second end of each planet pinion 42, thereby supporting the second end of the planet pinion 42 indirectly from the planet carrier 40.

Each one of the planet pinions 42 has a plurality of external gear teeth 44 which, in the illustrated embodiment, are spur gear teeth. The planet pinion gear teeth 44 can alternatively be helical gear teeth.

The gearbox 10 includes a ring gear 50. The ring gear 50 is substantially fixed relative to the interior of the gearbox housing 30. That is, the ring gear 50 has external splines which mate with splines on the interior of the housing 30, preventing the ring gear 50 from rotating relative to the housing 30. The ring gear 50 basically floats relative to the housing 30, in that it can move radially a slight amount, within the clearance between the external splines on the ring gear 50 and the internal splines on the housing 30. As illustrated, the ring gear 50 has a diameter of about fifty inches. The planet pinions 42 are substantially smaller in diameter than the ring gear 50.

The ring gear 50 has an array of internal spur or helical gear teeth 52. The internal gear teeth 52 on the ring gear 50 are in meshing engagement with the external gear teeth 44 on the planet pinions 42. As a result, orbital movement of the planet pinions 42 about the central axis 36, in response to rotation of the input hub 34 and the planet carrier 40 about the central axis, causes the planet pinions 42 to rotate about their own axes relative to the planet carrier 40. The rotational force transmitted from the rotor 20 to the input hub 34 is thus transmitted entirely to the planet pinions 42 to drive the planet pinions 42 to rotate about their own axes.

The gearbox 10 includes a plurality of planet gears 54. The number of planet gears 54 is equal to the number of planet pinions 42. In the illustrated embodiment, therefore, three planet gears 54 are provided; one is visible in the sectional view of FIG. 4.

Each of the planet gears 54 is fixed to one of the planet pinions 42 for rotation with its associated planet pinion 42. Thus, the gearbox 10 is a "compound" planetary gearbox. When the input hub 34 and the planet carrier 40 rotate, therefore, the rotational force of the input hub 34 is entirely transmitted through the planet pinions 42 to the planet gears 54 to drive the planet gears to rotate about the planet pinion axes.

The planet gears 54 are substantially larger in diameter than the planet pinions 42. Each one of the planet gears 54 has a plurality of external gear teeth 56 which, in the illustrated embodiment, are spur gear teeth. The planet gear teeth 56 may alternatively be helical gear teeth. If the planet gear teeth 56 and the planet pinion gear teeth 44 are helical, they are designed to be of generally equal but opposite inclination, so that their respective axial thrust forces cancel.

The gearbox 10 also includes a sun gear 60 mounted within the planet carrier 40, surrounded by the planet pinions 42. The sun gear 60 is radially supported by contact with the surrounding planet gears 54, for rotation of the sun gear 60 relative to the gear box housing 30 about the central axis 36. The sun gear 60 has a hollow bore along its axis, and along the axis of its shaft extension. A hollow tube 96, fixed to the final stage cover 92 on the gearbox housing 30, passes through the bore of the sun gear 60 and its shaft extension, substantially along the axis 36, to conduct control wiring (not shown) through the gear box 10 to the rotor 20. The sun gear 60 rotates relative to, but does not contact, the hollow tube 96. The sun gear 60 is substantially smaller in diameter than the planet gears 54.

The sun gear 60 has a plurality of external spur or helical gear teeth 61 that are in meshing engagement with the external gear teeth 56 on the planet gears 54. As a result, rotation of the planet gears 54 about their axes, in response to rotation of the input hub 34 and the planet pinions 42, causes the sun gear 60 to rotate about the central axis 36. The rotational force of the input hub 34 and the planet carrier 40 is thus entirely transmitted through the planet gears 54 to the sun gear 60, driving the sun gear for rotation about the central axis 36.

The gearbox 10 also includes a final stage 90, including a final stage end plate 94, the final stage cover 92, an output pinion 70, and a final stage gear 62. The final stage gear 62 is a spur or helical gear which rotates within bearings mounted to the final stage cover 92 and the final stage end plate 94. The final stage gear 62 is rotated with the sun gear 60, about the central axis 36, by a splined connection 64 at the end of the shaft extension of the sun gear 60. The splined end of the shaft extension of the sun gear 60 floats within the clearance in this splined connection to the final stage gear 62. The final stage gear 62 is substantially larger in diameter than the sun gear 60. The final stage gear 62 has a plurality of external spur or helical gear teeth 66.

The output pinion 70 has a set of external helical gear teeth 72. The output pinion 70 is supported by the final stage end plate 94 and the final stage cover 92, for rotation relative to the housing 30, about an axis 74 that extends parallel to the central axis 36. The output pinion 70 has a portion 76 that projects beyond the gearbox housing 30, for connection with the generator 26 via the output shaft 24.

The gear teeth 72 on the output pinion 70 are in meshing engagement with the external gear teeth 66 on the final stage gear 62. As a result, rotational force from the rotor 20, transmitted through the input hub 34, the planet carrier 40, the planet pinions 42, the planet gears 54, and the sun gear 60, is transmitted through the final stage gear 62 to the output pinion 70. Rotation of the output pinion 70 drives the generator 26 thereby producing electrical energy.

The gearbox 10 provides a gear reduction which, in the illustrated embodiment, can be, for example, a 72:1 (seventy-two to one) ratio. The rotor 20 rotates in response to wind movement past the wind turbine 12 at a low speed with a high torque. The low speed, high torque input of the rotor 20 is converted by the gearbox 10 to a high speed, low torque output suitable for driving the generator 26.

Input torque from the rotor 20 and the input hub 34 is split among the three planet pinions 42 and thus among the three planet gears 54, for transmission to the sun gear 60. This configuration spreads the high torque provided by the rotating input hub 34 among multiple transmission paths. At the only point in the gear train in which all the torque is concentrated in one gear and one path, that is, at the location of the sun gear 60, the amount of torque is substantially lower than the input torque, because the sun gear is rotating faster. In this manner, no portion of the gear train of the gearbox 10 is subjected to all the input torque. This helps to increase durability and reliability of the gear train in the gearbox 10.

The planet pinions 42, which engage the ring gear 50, do not directly engage the sun gear 60. Instead, the planet pinions 42 rotate the planet gears 54, which engage and drive the sun gear 60. Therefore, there is no reverse bending of the gear teeth 44 on the planet pinions 42, which might result if the planet pinions were interposed directly between the ring gear 50 and the sun gear 60. This elimination of reverse bending helps to increase the life of the planet pinions 42 and thus the reliability of the gearbox 10.

Figure 4:
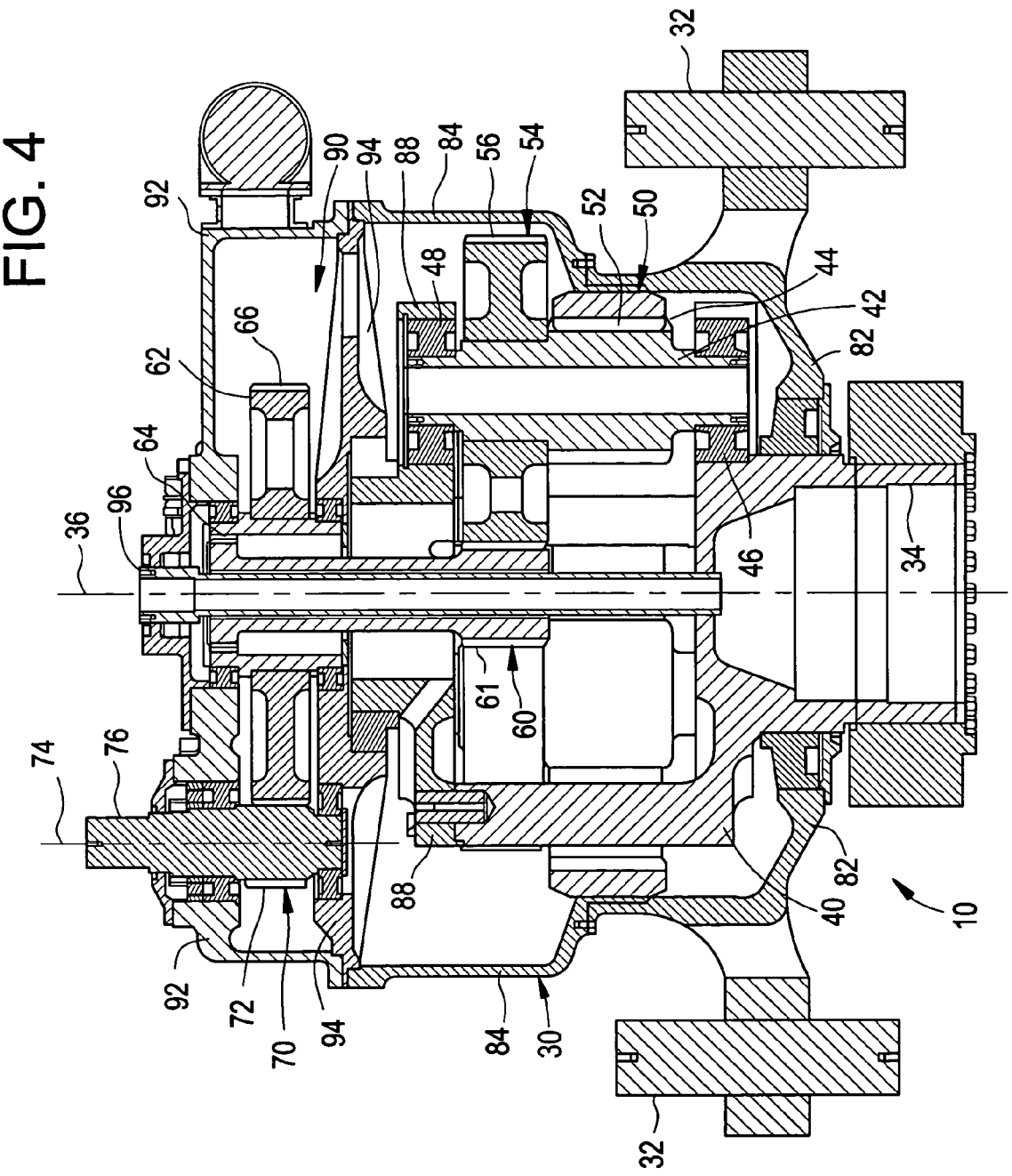
FIG. 4 is a longitudinal sectional view of the gearbox of FIG. 1.

It can also be seen from FIG. 4 that the final stage section 90 of the gear box 10, including the final stage end plate 94, the final stage cover 92, the output pinion 70, and the final stage gear 62, are removable (indeed, removable as a single unit) from the gear box 10, leaving the carrier end plate 88 exposed. Then, the carrier end plate 88 is removable from the second (or open) end of the planet carrier 40, exposing the planet bearings 48 on the second ends of the planet pinions 42 for removal. Thereafter, the planet pinions 42 and the planet bearings 46 on the first ends of the planet pinions 42 can be removed.

As compared to the prior art, the compound planetary gearbox 10 of the present invention can provide a higher power output (more torque at the same speed) from a gearbox that occupies the same volume of space. Alternatively, the same power output can be provided from a smaller volume of space. Further, the gear box 10 of the present invention enables much easier access to the planet pinions and planet bearings, for maintenance purposes.

The planet bearings 46, 48 also provide enhanced reliability, in that both the inner bearings and the outer bearings are subjected to similar loading patterns and have generally similar load carrying capability for providing generally the same reliability and the same servicing requirements. In that regard, the bearings 46, 48 at the first and second ends of the planet pinions 42 are of approximately equal size and load carrying capability (i.e, they are of the same type and of generally the same width and inner and outer diameters). In addition, the outer diameter of each of these bearings is approximately twice that of the inner diameter, thereby providing adequate space for high-capacity bearing members. The first bearings 46 and the second bearings 48 are positioned at the ends of the respective planet pinions 42, with the plant pinion gear teeth 52 and planet gear 54 being positioned between the planet bearings 46, 48. Thus, the planet pinion 42 is supported along its entire length by the bearings 46, 48, with no overhanging or cantilevered portions that impose increased stress on the bearings.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

I claim:

1. A compound planetary gear box for a wind turbine having a turbine blade and an electrical power generator for converting low-speed, high-torque rotary power from the turbine blade to high-speed, low-torque rotary power for electrical power generation, the gear box comprising:
   a housing;
   a ring gear substantially fixed relative to said housing at the interior thereof;
   a planet carrier mounted for rotation about a generally central axis within said ring gear and adapted to be driven at a first end thereof by the turbine blade;
   a removable end cover detachably secured to said housing adjacent a second end of said planet carrier;
   a plurality of planet pinions at spaced locations on said planet carrier around said central axis, with the axes of said planet pinions extending generally parallel to said central axis of said planet carrier;
   first and second bearings for each said planet pinion at first and second ends, respectively, of said planet pinion for engaging and supporting said ends of said planet pinion for rotation relative to said planet carrier;
   a plurality of gear teeth on each said planet pinion engageable with said ring gear and located between said first and second bearings;
   a planet gear on each said planet pinion located between said first and second bearings;

a sun gear rotatable about said central axis and engageable by said planet gears; and a final stage gear driven by, and detachably mounted to, said sun gear adjacent said second end of the planet carrier;

whereby all of the rotary power from the turbine blade is transmitted through said planet pinions, with each pinion being supported for rotation by bearings at both ends thereof.

2. The gear box of claim 1, wherein said gear teeth on said planet pinions are helical and said planet gears have helical gear teeth, with the inclination of said gear teeth on said planet gears being generally equal, but opposite, to the inclination of said gear teeth on said planet pinions.

3. The gear box of claim 1, wherein said planet pinions and said planet gears are spur gears.

4. The gear box of claim 1, further comprising an output pinion engageable with said final stage gear, with the axis of said output pinion extending generally parallel to but spaced apart from said central axis of said planet carrier.

5. The gear box of claim 1, wherein each said planet pinion is of generally the same outer diameter at said first and second ends thereof.

6. The gear box of claim 5, wherein said bearings for each said planet pinion are of generally the same width and inner and outer diameters.

7. The gear box of claim 5, wherein said bearings for each said planet pinion are of approximately equal size and load carrying capability.

8. The gear box of claim 7, wherein the outer diameter of each said bearing is generally twice said outer diameter of said ends of said planet pinion.

9. The gear box of claim 1, wherein said first bearing for said first end of each said planet pinion is engaged and supported by said planet carrier, further comprising at least one bearing support for engaging and supporting said second bearings for said second ends of said planet pinions relative to said planet earner.

10. The gear box of claim 9, wherein said at least one bearing support comprises an end plate detachably secured to said second end of said planet carrier.

11. The gear box of claim 9, wherein said at least one bearing support is adapted to be detached from said second end of said planet carrier after removal of said final stage gear.

12. The gear box of claim 11, wherein said second bearing at said second end of each said planet pinion is adapted to be accessed for removal after removal of said at least one bearing support.

13. The gear box of claim 12, wherein said planet pinions are adapted to be accessed for removal after removal of said second ends of said planet pinions.

14. The gear box of claim 13, wherein said first bearings at said first ends of said planet pinions are adapted to be accessed after removal of said planet pinions.

* * * * *